G. W. PROUTY.
MACHINE FOR WRAPPING BALES.
APPLICATION FILED JAN. 21, 1915.

1,179,035.

Patented Apr. 11, 1916.
4 SHEETS—SHEET 1.

Witnesses:
N. C. Lombard
Edward D. Allen

Inventor:
George W. Prouty,
by Walter E. Lombard
Atty.

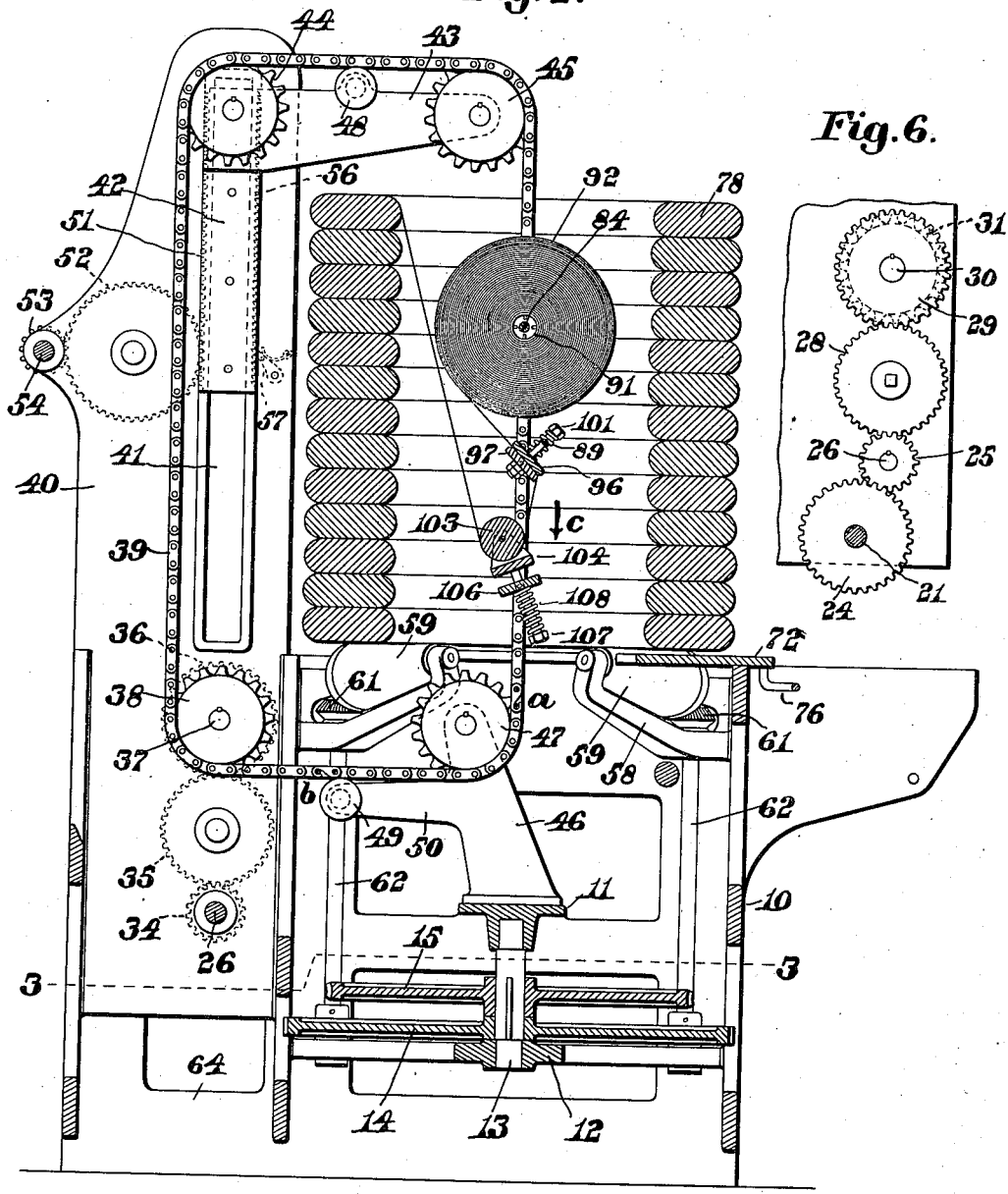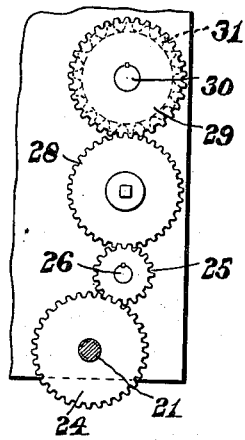

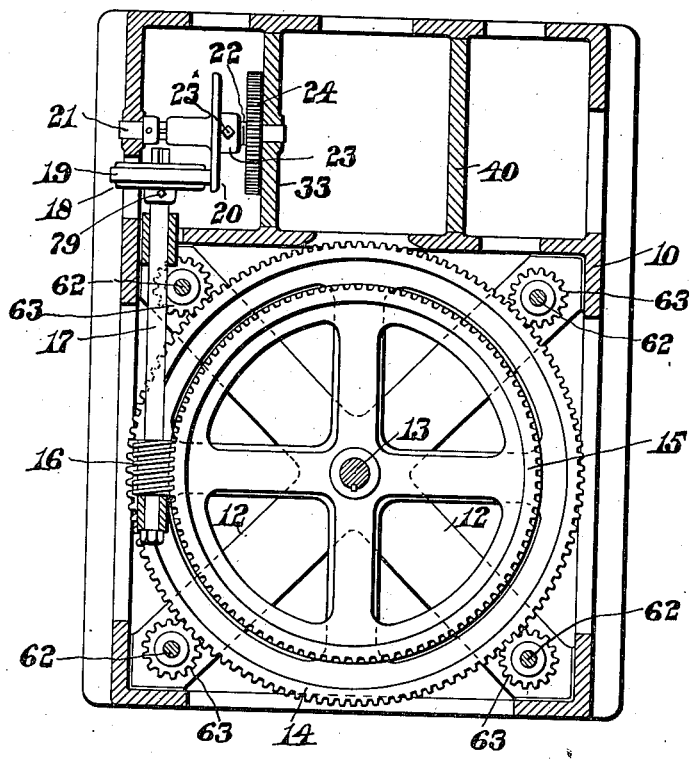
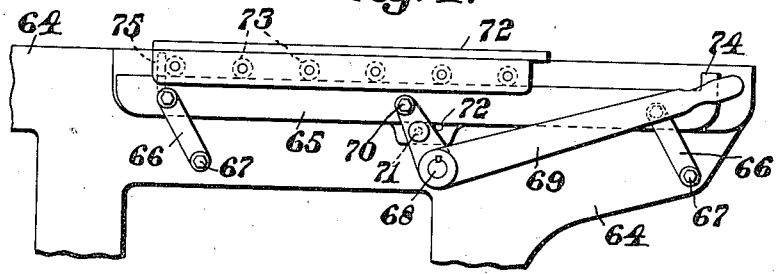

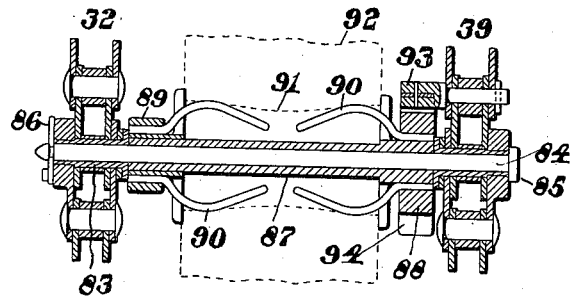
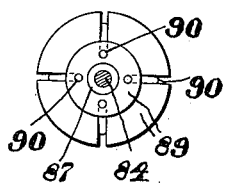
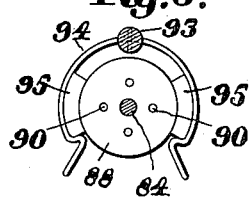
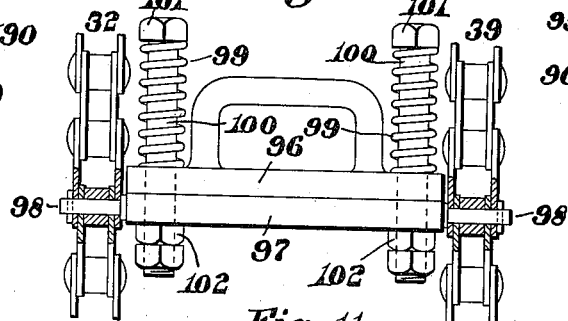
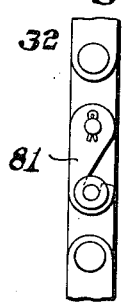
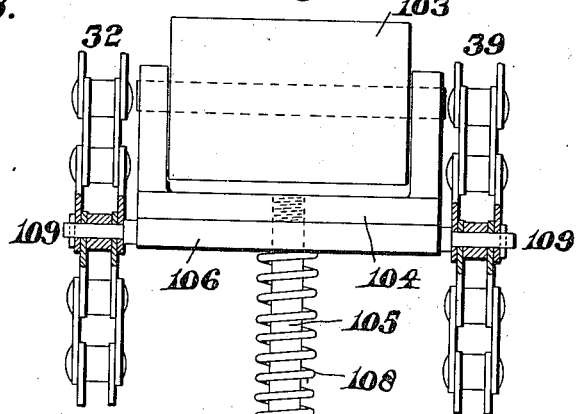
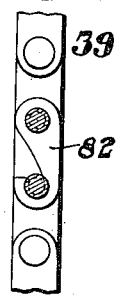
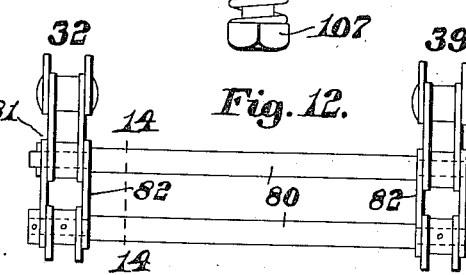

UNITED STATES PATENT OFFICE.

GEORGE W. PROUTY, OF DORCHESTER, MASSACHUSETTS.

MACHINE FOR WRAPPING BALES.

1,179,035.   Specification of Letters Patent.   Patented Apr. 11, 1916.

Application filed January 21, 1915. Serial No. 3,654.

*To all whom it may concern:*

Be it known that I, GEORGE W. PROUTY, a citizen of the United States of America, and a resident of Dorchester, in the county of Suffolk and State of Massachusetts, have invented certain new and useful Improvements in Machines for Wrapping Bales, of which the following is a specification.

This invention relates to wrapping machines, and has for its object the production of a machine of this character adapted to wrap a strip of material in a plurality of overlapping helixes over the inside and outside walls of a bale of manufactured goods in order to provide a neat package and protect the goods from damage during transportation.

The invention consists in certain novel features of construction and arrangement of parts which will be fully understood by reference to the description of the drawings and to the claims hereinafter given.

Figure 1:
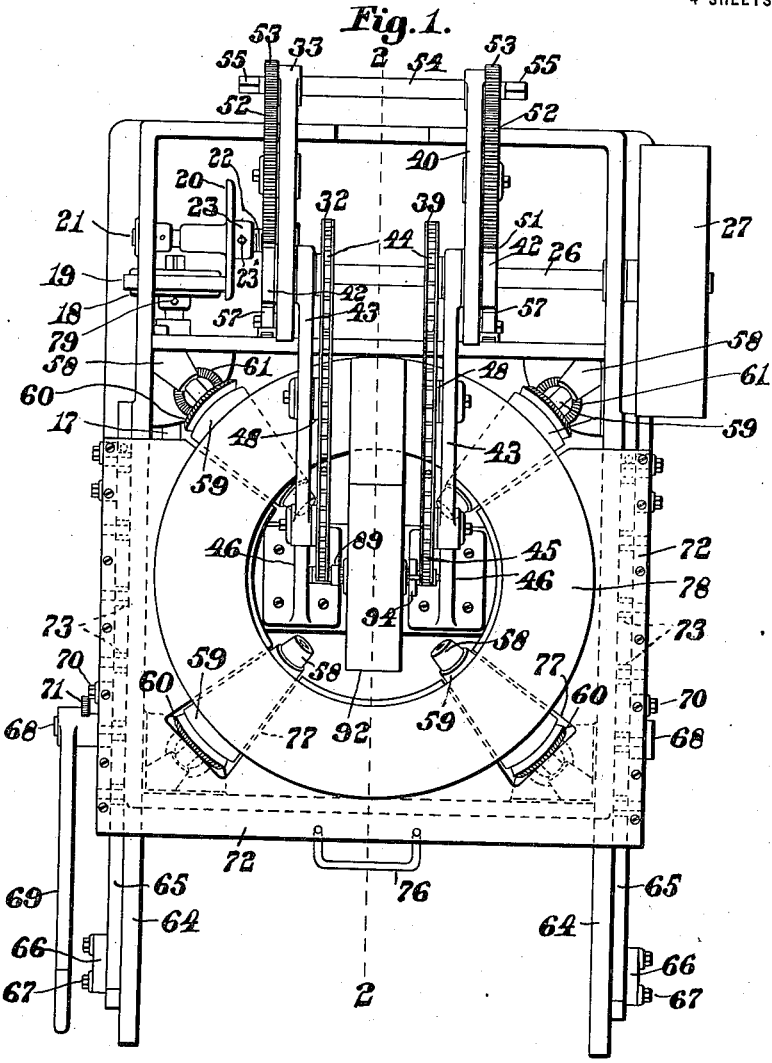
Figure 5:
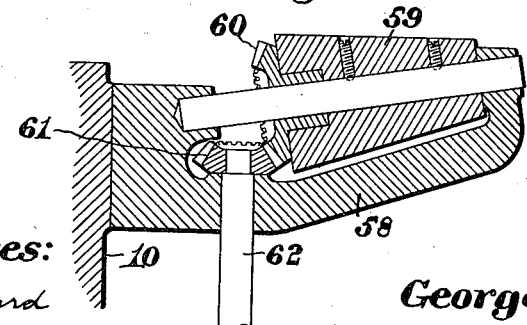

Of the drawings: Figure 1 represents a plan of a machine embodying the principles of the present invention. Fig. 2 represents a vertical section of the same, the cutting plane being on line 2—2 on Fig. 1. Fig. 3 represents a horizontal section, the cutting plane being on line 3—3 on Fig. 2. Fig. 4 represents a partial side elevation, showing the table lifting mechanism. Fig. 5 represents a sectional detail showing the means for imparting rotary movement to the bale supporting members. Fig. 6 represents an elevation of the gearing for driving the endless chains. Fig. 7 represents a sectional detail showing the means for supporting the roll of wrapping material on the endless chains and creating a friction on said roll. Fig. 8 represents an end view of one of the roll supporting members, and showing the support therefor in section. Fig. 9 represents an end view of the friction disk on one of said roll supporting members and showing the means for creating a friction on said disk. Fig. 10 represents an elevation of the device for creating a friction on the strip of wrapping material as it is delivered from the roll. Fig. 11 represents an elevation of the device for taking up the slack in the strip of wrapping material during the operation of wrapping. Fig. 12 represents an elevation of a portion of the endless chains showing the means of locking the ends together. Fig. 13 represents an end elevation of the parts shown in Fig. 12, and Fig. 14 represents a section on line 14—14 on Fig. 12.

Similar characters designate like parts throughout the several figures of the drawings.

In the drawings, 10 is a supporting frame provided with a cross member 11 and a spider 12 in which are formed bearings for a revoluble shaft 13. This shaft 13 has keyed thereto a large spur gear 14 and a worm gear 15. Meshing with the worm gear 15 is a worm 16 on a horizontal shaft 17 having at its opposite end a wheel 18 having on its periphery a friction member 19 adapted to bear against the face of a disk 20 mounted upon and keyed to a revoluble shaft 21. A portion of this shaft is threaded as at 22, and a nut 23 thereon bearing the rear face of the disk 20 is adjustable lengthwise of said shaft in order to regulate the frictional contact with the peripheral surface of the member 19. When the disk 20 has been properly adjusted, the nut 23 is locked in adjusted position by means of the set screw 23$^x$. Secured to and revoluble with the shaft 21 is a gear 24. A pinion 25 meshes with the gear 24 and imparts rotary movement thereto. This pinion 25 is keyed to a driving shaft 26 revolubly mounted in bearings in the framework 10 and having secured to its opposite end the driving pulley 27. The pinion 25 also meshes with and imparts rotary movement to an intermediate gear 28, which in turn meshes with a driving gear 29. This driving gear 29 is secured to and revolves with a short shaft 30, the opposite end of which has secured thereto a sprocket wheel 31 for driving the endless chain 32. The shaft 30 is mounted in bearings in a transom 33 extending upwardly beyond the main frame 10, as indicated in Fig. 2 of the drawings. The driving shaft 26 has also secured thereto a pinion 34 meshing with and imparting rotary movement to an intermediate gear 35, which in turn meshes with a driving gear 36 secured to and revoluble with a short shaft 37, the opposite end of which has secured thereto a sprocket wheel 38 adapted to drive an endless chain 39. This short shaft 37 is in alinement with the short shaft 26 and is revolubly mounted in the transom 40 parallel to the transom 33 and extending upwardly above the top of the main frame 10.

Each of the transoms 33 and 40 is provided with a vertical slot 41 in which is mounted the slidable member 42 having a lateral arm 43 at its upper end. Each of the arms 43 is provided with a pair of sprocket wheels 44 and 45 over which the endless chains 32 and 39 extend. The cross member 11 has secured thereto two upwardly extending brackets 46, each of which has revolubly mounted in its upper end a sprocket wheel 47 serving as a guide for one of the endless chains 32 or 39. Each of the arms 43 is also provided with the revoluble chain support 48 and each of the brackets 46 has a similar revoluble chain support 49 mounted in the end of a lateral arm 50. Each of the slidable members 42 is provided on one of its vertical edges with a plurality of rack teeth 51 meshing with a gear 52 the teeth of which in turn mesh with the teeth of a pinion 53 mounted upon and revoluble with a shaft 54, the outer ends of which have flat faces as indicated at 55 by which said shaft 54 may be turned to adjust the height of the slidable members 42 for various lengths of bales. The opposite edge of each of the slidable members has formed thereon a plurality of ratchet teeth 56 with which a spring pressed pawl 57 engages to lock the slidable member in adjusted position.

The framework 10 is provided with a plurality of inwardly extending arms 58 in each of which is revolubly mounted a cone-shaped bale supporting member 59 radiating from a center coincident with a prolongation of the axis of the revoluble shaft 13. Each revoluble bale supporting member 59 has secured to its outer end a bevel gear 60 meshing with a bevel pinion 61 secured to the upper end of a revoluble shaft 62. Each of these revoluble shafts 62 has secured to its lower end a pinion 63, the teeth of which mesh with the teeth of the large gear 14. The lower ends of the shafts 62 have bearings in the spider 12. On the outer face of each of the side frames 64 of the framework 10 is mounted a movable rail 65, the said rail being supported by a plurality of links 66 pivotally secured at their lower ends as at 67 to the side frames 64. To each of the side frames 64, at 68, is pivoted the bell crank operating lever 69, the shorter arm of each of which is pivotally secured at 70 to the movable rail 65. When the operator presses down upon the longer arm of the lever 69, the rail 65 will be moved toward the front of the machine until the locking pin 71 is engaged in the hole 72 to lock the movable rail in its forward position.

It is obvious that in moving toward the front of the machine the links will swing about the centers 67 and 68 and raise the rails a given distance.

Supported on the rails 65 is a table 72, the side flanges of which are provided with a plurality of trucks or rollers 73 adapted to travel along the movable rail 65. This rail 65 is provided with a stop 74 to limit the outward movement of said table, and a pin 75 at the rear end of said rails to limit the rearward movement of said table. The table 72 is provided with a handle 76 by which it may be moved along the rails 65 toward the front of the machine when lifted sufficiently by the levers 69 to disengage it from the revoluble supporting members 59, two of which are positioned in openings 77 cut through the forward part of said table. Normally, the table is in the position indicated in Fig. 2 of the drawings with its upper surface below the upper surface of the revoluble bale supporting members 59. A bale of any kind of material which it is desired to wrap may be placed upon the revoluble supporting members 59 and when the power is applied to the driving pulley 27, these revoluble members will cause the bale 78 to rotate at any desired speed. The speed of rotation may be regulated by adjusting the position of the wheel 18 longitudinally of its rotating shaft 17 and securing the wheel in adjusted position by means of the set screw 79. As shown in the drawings, the chains 32 and 39 are adjusted for the greatest length of bale with the arms 43 substantially at the upward limit of the movement of the slidable members 42. When it is desired to wrap a shorter bale, the pawl 57 may be disengaged from the ratchet teeth 56 and by turning the shaft 54 the slidable members may be moved downwardly into a new position and again locked in such position by means of the pawls 57.

It will be observed by reference to Fig. 12 of the drawings that the chains 32 and 39 are kept at a required distance apart by separating rods 80. The chains 32 and 39, with the separating rods 80, make an endless conveyer. When a shorter length of bale is being wrapped and the slidable members 42 are in lower position than indicated in Fig. 2 of the drawings, sections of the chains must be removed therefrom, as for instance a section from $a$ to $b$, as indicated in Fig. 2 of the drawings. In order to accomplish this, certain of the links of the chain are formed in the shape of hooks 81 and 82, as indicated in Figs. 13 and 14 of the drawings, these hook links 81 and 82 being adapted to hook over the ends of the separator rods 80—80 extending through the link pivots of the chains 32 and 39.

At one point in each of the chains 32 and 39 is mounted a sleeve 83, through which extends a quill or spindle 84 having a head 85 at one end and an annular peripheral groove in the opposite end adapted to be engaged by a spring member 86 to prevent the accidental displacement of said quill or spindle 84. Between the chains 32 and 39 and revolubly mounted upon the spindle 84 is a cylindrical member 87, one end of which has formed thereon or secured thereto a disk member 88 while the other end has removably mounted thereon a cylindrical member 89. Each of these members 88 and 89 is provided with a plurality of spring members 90 adapted to enter the core 91 of a roll of wrapping material 92. These spring members 90 impinge upon the walls of the core 91 and prevent the roll from rotating independently of the members 88 and 89. Secured to the chain 39 is a stud 93 having mounted thereon a spring member 94, the opposite ends of which are provided with friction pads 95 normally engaging the periphery of the disk member 88 and creating a friction thereon to prevent the reverse movement of the roll 92 or too rapid movement in the direction of feed. The members 88 and 89 are each provided with flanges having radial slots thereon for the spring members 90, said flanges being adapted to bear against and position the roll 92.

When it is desired to insert a new roll of wrapping material 92, the locking member 86 is disengaged from the annular peripheral groove in the end of the spindle 84, and this spindle 84 is then removed from the chains 32 and 39. This will permit the free removal of the sleeve or spool 87 and the parts mounted thereon. By removing the member 89 a new roll may be placed upon the spring members 80 attached to the disk 88 and then the member 89 with its spring members returned to its position upon the sleeve 87 as indicated in Fig. 7 of the drawings. The sleeve 87 with the new roll 92 thereon may then be positioned with the axis of the sleeve 87 in alinement with the axis of the tubular members 83 and the spindle 84 inserted through said tubular members and sleeve, the spring 86 immediately engaging the annular groove in the end of the spindle and locking it in position.

Prior to the wrapping operation the end of the strip on the rail 92 is inserted between some portions of the material to be wrapped or adhered thereto by any tacky substance. Before the end of the strip is secured to the bale, however, it is first passed between the friction plates 96 and 97, the plate 97 being provided with trunnions 98 extending through alined pivotal connections in two pairs of links in the chains 32 and 39. These trunnions 98 allow the plate 97 to move freely about its axis to accommodate itself to the line of movement of the strip of wrapping material. The plate 96 is normally held in contact with the plate 97 by means of the springs 99 surrounding studs 100 extending through both plate 96 and 97 and provided with heads 101 between which and the plate 96 the springs 99 are interposed. By means of the nuts 102 on the opposite end of the studs 100, the friction upon the strip of wrapping material may be adjusted in an obvious manner. The strip of wrapping material then passes from between the plates 96 and 97 around the revoluble roll 103 to its point of attachment with the bale 78. This revoluble roll is mounted in a frame 104 having a stud 105 secured thereto and extending through a plate 106. This stud 105 is provided with a head 107 between which and the plate 106 is interposed a helical spring 108. Normally the plate 104 is separated from the plate 106, as shown in Fig. 2 of the drawings, the spring 108 being under tension. As any slack occurs in the strip of wrapping material during the wrapping operation the spring 108 will tend to move the roll 103 toward the plate 106 and take up this slack. The plate 106 is provided with trunnions 109 extending through the links of the chains 32 and 39 as indicated in Fig. 11 of the drawings. The provision of the trunnions 109 permits the plate 106 to be moved about the axis of said trunnions to allow the roll 103 to accommodate itself to the wrapping operations as the endless conveyer 32—39 moves in the direction of the arrow c on Fig. 2 of the drawings.

When the machine is in operation the movement imparted to the revoluble bale supports 59 will cause the bale 78 to be rotated slowly while at the same time the endless conveyer 32—39 will be moved in the direction of the arrow c on Fig. 2 of the drawings. The end of the strip of wrapping material having been secured at some point upon the bale 78, this strip will be carried over the inner surface of the bale underneath the bottom thereof and then up over the outer surface of the bale. During this movement the bale is being moved about its vertical axis by the bale supporting members 59, and consequently the strip of wrapping material in its next cycle of movement will overlap the next preceding strip, thus forming a helical wind of material over the inside and outside surfaces of the bale as the wrapping operation continues.

When the wrapping operation is completed, the strip of wrapping material is cut from the roll and secured by any suitable adhesive substance to the completed package. This makes a very convenient package to be shipped, as the goods inclosed therein are protected from injury.

It is believed that the operation and many advantages of this machine will be fully understood from the foregoing description.

Having thus described my invention, I claim:

1. In a machine of the class described, the combination of a plurality of revoluble supporting members; means for imparting rotary movement to one of said supporting members; an endless flexible conveyer adapted to pass through and endwise of the outside of a bale supported on said members; means for driving said conveyer; a support movable with said conveyer and carrying a strip of wrapping material in a revoluble roll; and means carried by said conveyer for taking up the slack in the strip of material on said support.

2. In a machine of the class described, the combination of a plurality of revoluble supporting members; means for imparting rotary movement to one of said supporting members; an endless flexible conveyer adapted to pass through and endwise of the outside of a bale supported on said members; means for driving said conveyer; a support movable with said conveyer and carrying a strip of wrapping material; a vertically movable member for supporting said conveyer extending over the upper end of said bale; and means for locking said member in adjusted position.

3. In a machine of the class described, the combination of a plurality of revoluble supporting members; means for imparting rotary movement to one of said supporting members; an endless flexible conveyer adapted to pass through and endwise of the outside of a bale supported on said members; means for driving said conveyer; a support movable with said conveyer and carrying a strip of wrapping material; a table provided with recesses for said supporting members; and means for lifting said table above said members to remove the bale therefrom.

4. In a machine of the class described, the combination of a plurality of revoluble supporting members; means for imparting rotary movement to one of said supporting members; an endless flexible conveyer adapted to pass through and endwise of the outside of a bale supported on said members; means for driving said conveyer; a support movable with said conveyer and carrying a strip of wrapping material; a table provided with recesses for said supporting members; side rails supporting said table; and means for raising said side rails to transfer the bale from said supporting members to said table.

5. In a machine of the class described, the combination of a plurality of revoluble supporting members adapted to support a bale; an endless flexible conveyer adapted to pass through and endwise of the outside of said bale; means for driving said conveyer and rotating said revoluble bale supporting members; a support movable with said conveyer and carrying a strip of wrapping material; a slide provided with a conveyer supporting member; and means for locking said slide in adjusted position.

6. In a machine of the class described, the combination of a plurality of revoluble supporting members adapted to support a bale; an endless flexible conveyer adapted to pass through and endwise of the outside of said bale; means for driving said conveyer and rotating said revoluble bale supporting members; a support movable with said conveyer and carrying a strip of wrapping material; a slide provided with a conveyer supporting member and having a plurality of rack teeth; a gear meshing therewith; means for rotating said gear; and means for locking said slide in adjusted position.

7. In a machine of the class described, the combination of a frame; means thereon for supporting a bale and rotating it about its axis; an endless flexible conveyer adapted to pass through and endwise of the outside of said bale; means for driving said conveyer; a support movable with said conveyer and carrying a strip of wrapping material; and a device movable with said conveyer for creating a friction on said strip of paper.

8. In a machine of the class described, the combination of a frame; means thereon for supporting a bale and rotating it about its axis; an endless flexible conveyer adapted to pass through and endwise of the outside of said bale; means for driving said conveyer; a support movable with said conveyer and carrying a strip of wrapping material; a plate carried by said conveyer over which the strip of material is fed from said support; and a spring pressed plate supported by said conveyer plate and coacting therewith to create a friction on said strip.

9. In a machine of the class described, the combination of a frame; means thereon for supporting a bale and rotating it about its axis; an endless flexible conveyer adapted to pass through and endwise of the outside of said bale; means for driving said conveyer; a support movable with said conveyer and carrying a strip of wrapping material; a plate carried by said conveyer over which the strip of material is fed from said support; a spring pressed plate coacting therewith to create a friction on said strip; and means movable with said conveyer for taking up the slack in said strip.

10. In a machine of the class described, the combination of a frame; means thereon for supporting a bale and rotating it about its axis; an endless flexible conveyer adapted to pass through and endwise of the outside of said bale; means for driving said conveyer; a support movable with said conveyer and carrying a strip of wrapping material; and a spring controlled roller movable with said conveyer and around which the strip passes from the support to the bale adapted to take up the slack in said strip.

11. In a machine of the class described, the combination of a base; means thereon for supporting a bale and rotating it about its vertical axis; two uprights extending upwardly from said base at one side of said rotating means; a member movable lengthwise of each upright; revoluble chain supporting members on each movable member; revoluble chain guides below the bale supporting means; two endless chains on said chain supporting members and guides adapted to pass through and endwise of the outside of said bale; means for driving said chains; and means movable with and interposed between said chains for wrapping a strip of material around the interior and exterior of said bale.

12. In a machine of the class described, the combination of a base; means thereon for supporting a bale and rotating it about its vertical axis; two uprights extending upwardly from said base at one side of said rotating means; a member movable lengthwise of each upright provided with rack teeth; means coacting with said rack teeth for adjusting the position of said movable members and locking them in adjusted position; revoluble chain supporting members on each movable member; revoluble chain guides below the bale supporting means; two endless chains on said chain supporting members and guides adapted to pass through and endwise of the outside of said bale; means for driving said chains; and means movable with and interposed between said chains for wrapping a strip of material around the interior and exterior of said bale.

13. In a machine of the class described, the combination of means for supporting and rotating a bale; an endless flexible conveyer adapted to pass through and endwise of the outside of said bale; a roll of wrapping material supported by and movable with said conveyer; spring members carried by said conveyer and extending into and in contact with the wall of the core of said roll; and means carried by said conveyer for creating a friction on said spring members to retard the rotation thereof.

14. In a machine of the class described, the combination of means for supporting and rotating a bale; an endless flexible conveyer adapted to pass through and endwise of the outside of said bale; a roll of wrapping material supported by and movable with said conveyer; spring members carried by said conveyer and extending into and in contact with the wall of the core of said roll; a disk secured to one of said spring members; and a friction device carried by said conveyer and engaging said disk to retard the rotation of said roll.

15. In a machine of the class described, the combination of means for supporting and rotating a bale; a pair of endless chains forming a flexible conveyer adapted to pass through and endwise of the outside of said bale; a pin interposed between and secured to said chains; a revoluble sleeve mounted thereon between said chains; a roll of wrapping material surrounding said sleeve; members on said sleeve having spring fingers entering the core of said roll and engaging the wall thereof; a disk member secured to one of said spring members; and a friction member carried by said conveyer and engaging the periphery of said disk.

16. In a machine of the class described, the combination of means for supporting and rotating a bale; a pair of endless chains forming a flexible conveyer adapted to pass through and endwise of the outside of said bale; a pin interposed between and secured to said chains; a revoluble sleeve mounted thereon between said chains; a roll of wrapping material surrounding said sleeve; members on said sleeve having spring fingers entering the core of said roll and engaging the wall thereof; one of said members consisting in part of a disk; a spring secured to and movable with said chain conveyer; and a friction pad on each end thereof adapted to engage the periphery of said disk.

Signed by me at 4 Post Office Sq., Boston, Mass., this 16th day of January, 1915.

GEORGE W. PROUTY.

Witnesses:
WALTER E. LOMBARD,
NATHAN C. LOMBARD.